(12) United States Patent
Ueda et al.

(10) Patent No.: US 6,627,681 B1
(45) Date of Patent: Sep. 30, 2003

(54) METHOD OF DECREASING UNREACTED MONOMER IN VINYL POLYMER AND A TONER RESIN IN WHICH UNREACTED MONOMER HAS BEEN DECREASED

(75) Inventors: Hikoji Ueda, Kitakatsushika-gun (JP); Masamitsu Mogi, Tokyo (JP); Masao Watanabe, Kitakatsushika-gun (JP); Yutaka Kukimoto, Tokyo (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 41 days.

(21) Appl. No.: 09/913,882

(22) PCT Filed: Dec. 20, 2000

(86) PCT No.: PCT/JP00/09039

§ 371 (c)(1),
(2), (4) Date: Aug. 16, 2001

(87) PCT Pub. No.: WO01/48030

PCT Pub. Date: Jul. 5, 2001

(30) Foreign Application Priority Data

Dec. 27, 1999 (JP) ............................................ 11-371950

(51) Int. Cl.[7] ................................................ C08K 3/30
(52) U.S. Cl. ....................... 523/343; 524/556; 524/565; 528/485
(58) Field of Search .......................... 523/343; 524/556, 524/565; 528/485

(56) References Cited

U.S. PATENT DOCUMENTS 4,255,307 A    3/1981   Miller ................. 260/29.6 PT

FOREIGN PATENT DOCUMENTS

| DE | 197 41 189 A1 | 3/1999 | |
|---|---|---|---|
| JP | 55-65207 | 5/1980 | |
| JP | Sho 61-228012 | 10/1986 | |
| JP | Sho 64-70765 | 3/1989 | |
| JP | 3-44561 B2 | 7/1991 | ............. C05F/6/14 |
| JP | Hei 4-55203 | 9/1992 | |
| JP | 5-142860 | 11/1993 | |
| JP | 9-50150 A | 2/1997 | ............. G03G/9/08 |

*Primary Examiner*—Bernard Lipman
(74) *Attorney, Agent, or Firm*—Sierra Patent Group, Ltd.

(57) ABSTRACT

The method of decreasing unreacted monomer in vinyl polymer of the present invention is a method comprising adding a water-soluble inorganic salt that is able to solubilize unreacted monomer contained in vinyl polymer to an aqueous dispersion in which particles of vinyl polymer are dispersed in an aqueous medium, followed by solubilizing the unreacted monomer and removing the unreacted monomer together with the aqueous medium. According to this method, the amount of unreacted monomer present in a polymer can be efficiently and reliably decreased at low cost without requiring a special apparatus or thermal energy, etc. In addition, the toner resin of the present invention has for its constituent component a vinyl polymer in which the amount of unreacted monomer has been decreased by the method described above. In addition to solving the problem of a foul odor being generated during toner production and fixation when copying, the vinyl polymer obtained according to the method of the present invention also has superior effects such as contributing to improvement of toner characteristics.

18 Claims, No Drawings

METHOD OF DECREASING UNREACTED MONOMER IN VINYL POLYMER AND A TONER RESIN IN WHICH UNREACTED MONOMER HAS BEEN DECREASED

TECHNICAL FIELD

The present invention relates to a method of efficiently decreasing the amount of unreacted monomer remaining in a polymer without requiring a special apparatus or a complex process, and a toner resin having for its constituent component a polymer in which the amount of unreacted monomer has been decreased by that method.

This application is based on a patent application filed in the country of Japan (Japanese Patent Application No. Hei 11-371950), and the described contents of said Japanese patent application are incorporated as a part of the present specification.

BACKGROUND ART

Vinyl polymers are typically produced by polymerization of vinyl monomer by a polymerization method such as bulk polymerization, solution polymerization, suspension polymerization, emulsion polymerization or dispersion polymerization and so forth. In the case of these polymerization methods, it is difficult to completely polymerize the vinyl monomer at a rate of polymerization of 100%. Thus, in many cases, unreacted monomer that has not undergone polymerization usually remains in the polymer. In addition to impairing the mechanical characteristics, thermal characteristics, chemical characteristics and so forth of the polymer, unreacted monomer remaining in the polymer also causes problems which the generation of an unpleasant odor during handling of said polymer and when the polymer is made into a final product. Consequently, several methods have been proposed in the prior art for removing unreacted monomer from polymers.

For example, it is pointed out in Japanese Patent Application, Second Publication No. Hei 4-55203 that, when unreacted monomer remains in a polymer, the problem results in which a foul odor is generated during melting and kneading processing and when preparing a polymer solution. In order to solve this problem, a method for removing unreacted monomer is proposed in which an aqueous slurry containing polymer particles is distilled in the presence of suspension dispersant and non-ionic surfactant or polypropylene glycol or its derivative.

In addition, a method for decreasing unreacted monomer is proposed in Japanese Patent Application, First Publication No. Hei 1-70765 that is used as a method for removing unreacted monomer from a toner resin used in an electrophotographic developer in which, following suspension polymerization, the resulting suspension is heated at a temperature equal to or higher than the glass transition temperature of the resulting resin and water in an amount of 5–50 wt % based on the amount of water present at completion of polymerization is distilled from the suspension in the form of water vapor.

Moreover, as a method for removing unreacted monomer and other volatile components from a modified styrene polymer mixture, Japanese Patent Application, First Publication No. Sho 61-228012 proposes a method for removing unreacted monomer and volatile components in two stages by two stages of a volatile component separation apparatus having a constitution in which a multipipe heat exchanger type preheater and volatilizer are coupled directly.

The methods described in the above Japanese Patent Application, Second Publication No. Hei 4-55203 and Japanese Patent Application, First Publication No. Hei 1-70765 both attempt to remove unreacted monomer by steam distillation. Thus, these methods have the problem of requiring a large amount of thermal energy for steam distillation, thereby increasing the cost of removing unreacted monomer.

In addition, the method described in Japanese Patent Application, First Publication No. sho 61-228012 requires a special apparatus and other incidental apparatuses such as a vacuum pump for degassing, while also requiring energy consumption for preheating the polymerization reaction mixture. Consequently, this method has the problem of increasing the processing cost in the same manner as described above.

Thus, the object of the present invention is to provide a method for inexpensively and efficiently decreasing the amount of unreacted monomer in a vinyl polymer without requiring a special apparatus or thermal energy and so forth.

DISCLOSURE OF INVENTION

The method for decreasing unreacted monomer in vinyl polymer of the present invention comprises: adding to an aqueous dispersion in which a vinyl polymer is dispersed in an aqueous medium in the form of particles a water-soluble inorganic salt that is able to solubilize unreacted monomer contained in said vinyl polymer followed by solubilizing unreacted monomer and removing unreacted monomer together with aqueous medium. According to this method, the amount of unreacted monomer in the polymer can be inexpensively, efficiently and reliably decreased without requiring a special apparatus or thermal energy and so forth.

In addition, in the method of decreasing unreacted monomer in vinyl polymer of the present invention, the above water-soluble inorganic salt is preferably used within a range of 0.5–30 parts by weight relative to 100 parts by weight of vinyl polymer in the aqueous dispersion. In addition, the water-soluble inorganic salt is preferably anhydrous sodium bisulfite. Moreover, solubilization of unreacted monomer by water-soluble inorganic salt is preferably carried out at a temperature within the range of the glass transition point of the polymer contained in the aqueous dispersion to 150° C.

In addition, the toner resin of the present invention has for its constituent component a vinyl polymer in which the amount of unreacted monomer has been decreased by the above method. In the case of being used as a toner resin in an electrophotographic method, vinyl polymer obtained according to the method of the present invention solves the problem of the generation of a foul odor during toner production and during fixation when copying, while also have other superior characteristics such as contributing to improvement of toner characteristics.

BEST MODE FOR CARRYING OUT THE INVENTION

Examples of vinyl polymers in the present invention include homopolymers or copolymers of aromatic vinyl monomers such as styrene and α-methylstyrene; or acrylic monomers such as methacrylic ester and acrylic ester. Furthermore, the vinyl polymer in the present invention is not limited to these. Polymers comprised by copolymerizing said monomers and other polymerizable monomers that can be copolymerized with said monomers, examples of which include vinyl acetate, vinyl propionate, vinyl chloride and acrylonitile, can also be used for the vinyl polymer of the present invention. In addition, these vinyl polymers may be non-crosslinked polymers or crosslinked polymers.

It is necessary that the above vinyl polymer be suspended or dispersed in an aqueous medium in the form of particles. There are no particular restrictions on the size of those particles. However, if the particle size is too small, the disadvantage results in which the workability of post-processing steps such as filtration, dehydration and drying of polymer particles in the final steps decreases. Conversely, if particle size is too large, it becomes difficult to remove unreacted monomer remaining within the particles, thereby preventing obtaining of the expected decreasing effects. Thus, in the present invention, the particle size of polymer particles contained in the aqueous dispersion is preferably within the range of 0.01–3000 μm.

Furthermore, in the case of having polymerized the above vinyl monomer by ordinary emulsion polymerization, polymer particles are typically formed having a particle size within the range of 0.05–10 μm. In addition, in the case of having polymerized the above vinyl monomer by ordinary suspension polymerization, polymer particles are typically formed having a particle size within the range of 1–1000 μm. In this manner, polymer particles obtained by these polymerization methods are all within the above preferable particle size range. Thus, dispersions obtained by emulsion polymerization or suspension polymerization can be used directly as aqueous dispersions in the present invention.

In addition, in the case of having obtained vinyl polymer by a method such as bulk polymerization or solution polymerization, the aqueous dispersion in the present invention can be obtained by crushing so as to be within the above preferable particle size range and suspending or dispersing in an aqueous medium in the presence of a suitable dispersant as necessary.

In addition, water alone or a mixture of water and water-soluble organic solvent (such as methanol, ethanol, isopropanol or acetone) can be used for the aqueous medium of the aqueous dispersion that contains vinyl polymer particles. In the case of using a mixture of water-soluble organic solvents, if the amount of said organic solvent is excessively great, the solubility of the water-soluble inorganic salt may decrease during solubilization of unreacted monomer, or the dispersion system of the dispersion may be destroyed. Thus, said organic solvent is preferably contained within a range that does not exceed 50 wt % in the aqueous medium.

In addition, a dispersant is preferably added to the above aqueous medium for the purpose of stabilizing the dispersed state of the vinyl polymer. Examples of dispersants include water-soluble polymers such as partially saponified polyvinyl alcohol, sodium polymethacrylate and sodium polyacrylate; and water-refractory or water-insoluble inorganic salts such as barium sulfate, calcium sulfate, barium carbonate and calcium carbonate.

Solubilization of unreacted monomer by water-soluble inorganic salt can be carried out by adding water-soluble inorganic salt to an aqueous dispersion containing vinyl polymer particles in the form of an aqueous solution as necessary. The amount of water-soluble inorganic salt added in this case is preferably within the range of 0.5–30 parts by weight, and more preferably within the range of 1–10 parts by weight, relative to 100 parts by weight of vinyl polymer in the dispersion. If the amount of water-soluble inorganic salt added is less than 0.5 parts by weight, there is the risk of solubilization of unreacted monomer not being carried out adequately. Conversely, if the amount of water-soluble inorganic salt added exceeds 30 parts by weight, in addition to resulting in the risk of destruction of the dispersion system of the dispersion, the effect of decreasing the amount of unreacted monomer does not increase proportional to the amount added, thereby making this uneconomical.

Water-soluble inorganic salts that can be used in the present invention may be any water-soluble inorganic salt provided it is able to solubilize unreacted monomer, specific examples of which include anhydrous sodium bisulfite, anhydrous potassium bisulfite and anhydrous ammonium bisulfite. The use of anhydrous sodium bisulfite in particular is preferable in consideration of ease of acquisition on the market, ease of handling and so forth.

Furthermore, when solubilizing unreacted monomer with the above water-soluble inorganic salt, the pH of the aqueous dispersion may fluctuate considerably as a result of adding a large amount of said water-soluble inorganic salt. Consequently, said aqueous dispersion system may be destroyed, or the water-soluble inorganic salt itself may decompose. Thus, when adding water-soluble inorganic salt, the pH of the aqueous dispersion is preferably suitably adjusted to be within the range of 5–11.

In addition, during solubilization of unreacted monomer by water-soluble inorganic salt, it is preferable to add an oxidant (such as an organic peroxide) to the aqueous dispersion to further promote solubilization.

Although solubilization of unreacted monomer in the present invention may be carried out at normal temperature, it is preferably carried out while heating to enhance the efficiency of solubilization. Although there are no particular restrictions on the temperature conditions at that time, solubilization is preferably carried out under temperature conditions of a temperature greater than or equal to the glass transition point of the vinyl polymer contained in the aqueous dispersion up to 150° C. If the temperature for solubilization is greater than or equal to the glass transition point, it becomes easier for the unreacted polymer inside the polymer granules to penetrate to the surface of the particles, thereby increasing the opportunity for contact between unreacted monomer and water-soluble inorganic salt, and resulting in greater decreasing effect on the amount of unreacted monomer, thereby making this preferable.

In particular, a dispersion prepared by emulsion polymerization, suspension polymerization or dispersion polymerization and so forth can be used directly in the method of the present invention. Consequently, if the solubilization step is carried out by adding water-soluble inorganic salt when the dispersion is heated immediately after these polymerization procedures, it is not necessary to heat the aqueous dispersion once more to promote solubilization. Therefore, the method of decreasing the amount of unreacted monomer of the present invention can be said to be an extremely advantageous method with low loss of energy. In this manner, the method of decreasing unreacted monomer of the present invention is particularly suited to being carried out in continuation from a polymerization procedure such as emulsion polymerization, suspension polymerization or dispersion polymerization and so forth.

Solubilization of unreacted monomer in the present invention can be carried out by adding a prescribed amount of water-soluble inorganic salt to the above aqueous dispersion containing vinyl polymer particles and making said dispersion uniform by stirring and so forth. Although there are no particular restrictions on the treatment time of solubilization at that time, the treatment time can be shortened as the temperature of the aqueous dispersion becomes higher. In general, in the case the dispersion is in the vicinity of normal temperature, the treatment time is preferably about 2–10 hours, and in the case the dispersion is at a temperature equal to or greater than the glass transition point, the treatment time is preferably from about 10 minutes to 4 hours.

By suitably carrying out procedures such as filtration, washing and dehydration in accordance with routine methods on polymer particles obtained from a dispersion containing vinyl polymer particles on which this solubilization treatment has been completed, solubilized unreacted monomer can be removed together with the aqueous dispersion. Thus, a vinyl polymer is obtained in which the amount of unreacted monomer has been decreased.

Since the amount of unreacted monomer in a vinyl polymer obtained according to the method of the present invention as described above has been decreased to the extent such that hardly any unreacted monomer remains, the generation of foul odor caused by the presence of unreacted monomer is either completely eliminated or present only extremely slightly. Thus, said polymer can be preferably used in various applications accompanying processing conditions or usage conditions in which said polymer is in a melted state.

For example, a toner used in the field of electrophotography is typically produced by going through a process in which resin and other toner constituent components are melted and kneaded. In addition, toner images formed on a paper surface are fixed as a result of the toner being melted with a heated roller and so forth. The above vinyl polymer obtained by the method of the present invention can be used particularly preferably as a toner resin of electrophotography that is subjected to such repeated melting.

EXAMPLES

The following provides a detailed explanation of the present invention through its examples. Furthermore, in the blending formulations of the following examples, the blended amounts and copolymerization ratios of each component are indicated in parts by weight unless specifically indicated otherwise. In addition, "parts" indicates "parts by weight" unless specifically indicated otherwise.

Examples 1–6 and Comparative Example 1

A monomer mixture comprising 80 parts of styrene, 20 parts of n-butylacrylate, 0.5 parts of divinylbenzene, 3 parts of benzoyl peroxide and 0.5 parts of t-butylperbenzoate was added to an aqueous phase consisting of 250 parts of pure water and 0.2 parts of partially saponified polyvinyl alcohol (The Nippon Synthetic Chemical Industry Co., Ltd., GOHSENOL GH-20). This mixture was heated to 130° C. while stirring after which suspension polymerization was carried out for 1 hour by an autoclave reaction to obtain a dispersion containing polymer particles having a glass transition temperature (Tg) of 600 and mean particle size of 150 μm.

Anhydrous sodium bisulfite (SBS) was added to the dispersion obtained above in accordance with the blending formulas indicated in Table 1 below, after which the pH of the dispersion was adjusted to be within the range of 5–9 with sodium hydroxide, and solubilization treatment was carried out under the respective conditions (treatment temperature and treatment time). After filtering the dispersions on which solubilization treatment was performed, the polymer was washed, dehydrated and dried. The amounts of unreacted monomer remaining in the resulting polymers were measured by gas chromatography. The results of measurement are shown in Table 1 below.

TABLE 1

| Example No. | Amount of SBS (parts) | Treatment temperature (° C.) | Treatment time | Amount of unreacted monomer |
|---|---|---|---|---|
| Example 1 | 4.0 | 120 | 1 hr. | 10 ppm or less |
| Example 2 | 3.0 | 130 | 30 min. | 10 ppm or less |
| Example 3 | 8.0 | 90 | 3 hrs. | 20 ppm |
| Example 4 | 1.0 | 110 | 1 hr. | 30 ppm |
| Example 5 | 4.0 | 40 | 5 hrs. | 900 ppm |
| Example 6 | 0.2 | 110 | 2 hrs. | 800 ppm |
| Comp. Ex. 1 | 0 | 120 | 1 hr. | 1500 ppm |

Example 7

100 parts of particles (mean particle size=500 μm) obtained by crushing styrene-2-ethylhexylacrylate-n-butylmethacrylate copolymer (copolymerization ratio= 70:10:20, Mn=14,000, Mw=294,000, Tg=70° C.) were dispersed in an aqueous phase consisting of 300 parts of pure water and 0.3 parts of Gohsenol GH-20 (same as that used in Example 1). 3 parts of anhydrous sodium bisulfite and 2.5 parts of a 25% aqueous solution of sodium hydroxide were added to this dispersion followed by carrying out solubilization treatment for 2 hours at 90° C. After filtering the dispersion on which solubilization treatment had been carried out, the polymer was washed, dehydrated and dried. The amount of unreacted monomer remaining in the resulting polymer was measured by gas chromatography. The results of measurement are shown in Table 2.

Example 8

100 parts of methylmethacrylate polymer particles obtained by suspension polymerization (Mn=17,000, Mw=115,000, Tg=100° C., mean particle size=80 μm, amount of unreacted monomer in polymer particles=12,000 ppm) were dispersed in an aqueous phase consisting of 300 parts of pure water and 0.3 parts of Gohsenol GH-20 (same as that used in Example 1). 6 parts of anhydrous sodium bisulfite and 5 parts of a 25% aqueous solution of sodium hydroxide were added to this dispersion, followed by carrying out solubilization treatment for 3 hours at 120° C. in an autoclave. After filtering the dispersion on which solubilization treatment had been carried out, the polymer was washed, dehydrated and dried. The amount of unreacted monomer remaining in the resulting polymer was measured by gas chromatography. The results of measurement are shown in Table 2.

Example 9

Calcium nitrate was added to a styrene-butylacrylate copolymer emulsion, and 100 parts of polymer obtained by salting out the copolymer (copolymerization ratio=75:25, Mn=570,000, Mw=1,780,000, Tg=70° C., amount of unreacted monomer in copolymerized polymer=3,000 ppm) were dispersed in an aqueous phase comprised of 500 parts of pure water and 0.4 parts of Gohsenol GH-20 (same as that used in Example 1). After adding 4 parts of anhydrous sodium bisulfite and 4 parts of a 25% aqueous solution of sodium hydroxide to this dispersion, solubilization treatment was carried out for 1 hour at 110° C. using an autoclave. After filtering the dispersion on which solubilization treatment had been carried out, the polymer was washed, dehydrated and dried. The amount of unreacted monomer remaining in the resulting polymer was measured by gas chromatography, and those measurement results are shown in Table 2.

Example 10

8 parts of anhydrous sodium bisulfite and 8 parts of a 25% aqueous solution of sodium hydroxide were added to 500 parts (100 parts of polymer) of a styrene-butylacrylate copolymer emulsion (copolymerization ratio=80:20, Mn=80,000, Mw=3,470,000, Tg=70° C., amount of unreacted monomer in copolymerized polymer=800 ppm, polymer concentration: 20 wt %), and solubilization treatment was carried out for 2 hours at 90° C. Calcium nitrate was then added to this dispersion to salt out the polymer. After filtering this dispersion, the polymer was washed, dehydrated and dried. The amount of unreacted monomer remaining in the resulting polymer was measured by gas chromatography, and those measurement results are shown in Table 2.

Comparative Example 2

Treatment was carried out in the same manner as Example 7 with the exception of not adding anhydrous sodium bisulfite. The amount of unreacted monomer in the resulting polymer was measured in the same manner, and those measurement results are shown in Table 2.

TABLE 2

| Example No. | Amount of unreacted monomer |
| --- | --- |
| Example 7 | 30 ppm |
| Example 8 | 1800 ppm |
| Example 9 | 10 ppm |
| Example 10 | 150 ppm |
| Comparative Example 2 | 1500 ppm |

Example 11

80 parts of the polymer obtained in Example 1, 4 parts of carbon black (Mitsubishi Chemical Corporation, MA-100), 2.4 parts of charge controller (Orient Chemical Industries, Ltd., BONTRON S-34) and 1.6 parts of polypropylene (Sanyo Chemical Industries, Ltd., Viscol 550P) were mixed and then heat kneaded at 130° C. using a heating roll mixer (Toyo Seiki Seisaku-Sho, Ltd., Labo Plastomill). After cooling the kneaded product, it was crushed and graded to obtain Toner A having a mean particle size of 8–10 $\mu$m. In addition, Toner B was obtained in the same manner as Toner B using the polymer of Comparative Example 1.

Toner A and Toner B obtained in the manner described above were tested for the amount of unreacted monomer (measured by gas chromatography), odor (sensory test using panelists) and storage stability (presence or absence of blocking after allowing to stand for 24 hours at 50° C.). The test results are shown in Table 3 below.

TABLE 3

| Toner Type | Amt. of unreacted monomer | Odor | Storage stability |
| --- | --- | --- | --- |
| Toner A | 10 ppm or less | ◯ | ◯ |
| Toner B | 800 ppm | Δ | x |

Method for Measuring Amount of Unreacted Monomer (Sample Preparation)

2 g of sample were dissolved in 50 g of ethyl acetate followed by the addition of 1 ml of an internal standard solution consisting of 0.1 g of α-methylstyrene diluted with 50 ml of ethyl acetate. This solution was used as the measurement sample. 1 $\mu$l of measurement sample was sampled with a microsyringe followed by measurement of the amount of unreacted monomer by gas chromatography under the conditions indicated below.

(Measurement Conditions)

Measurement was carried out at a column temperature of 90° C. and injection temperature of 200° C. using a gas chromatograph (Hitachi, Ltd., G-5000), data processor (Hitachi, Ltd., D-2500) and column (GL Science Inc., TC-WAX, 30 m×0.53 mm).

Odor Confirmation Method 10 g of toner were placed in a 100 ml glass bottle and a sensory test was carried out at normal temperature using 10 panelists. The results were expressed using the symbols indicated below.

◯: 8 or more panelists did not notice an odor

Δ: 5 to 7 panelists did not notice an odor x 4 or less panelists did not notice an odor

Storage Stability Test 30 g of toner were placed in an 80 mm×65 mm polyethylene bag and after extracting air from the bag, the bag was sealed and allowed to stand for 24 hours in an atmosphere at 50° C. After 24 hours, the bag was opened and the contents were poured onto a sieve having a mesh size of 1 mm, and after gently shaking the sieve 10 times, storage stability was assessed using the symbols indicated below according to the amount remaining on the sieve.

◯: Less than 1 g remaining on sieve x: 1 g or more remaining on sieve

Industrial Applicability

The method of decreasing unreacted monomer in vinyl polymer of the present invention is able to efficiently and reliably decrease the amount of unreacted monomer in a polymer by employing a method in which a water-soluble inorganic salt capable of solubilizing unreacted monomer is added to an aqueous dispersion containing particles of vinyl polymer.

Moreover, since the method of the present invention does not require any special apparatus and does not necessarily require thermal energy, the amount of unreacted monomer can be decreased at an extremely low cost.

In addition, in the case of embodying in the form of a toner resin used in electrophotography, the vinyl polymer obtained according to the method of the present invention eliminates problems with the generation of a foul odor during toner production and fixation during copying, while also offering other superior characteristics such as contributing to improvement of toner characteristics.

What is claimed is:

1. A method of decreasing unreacted monomer in a vinyl polymer comprising:

providing an aqueous solution containing a dispersed vinyl polymer in the form of particles, said dispersed vinyl polymer having unreacted monomers and said unreacted monomer being at least one of aromatic vinyl monomer, methacrylic ester, and acrylic ester;

adding anhydrous bisulfite; and removing said unreacted monomers by solubilizing said unreacted monomers with said anhydrous bisulfite.

2. The method according to claim 1 wherein said anhydrous bisulfite is present in an amount of about 0.5 to 30 parts by weight; and said vinyl polymer is present in an amount of about 100 parts by weight.

3. The method according to claim 1 wherein said solubilization is carried out at a temperature of a glass transition point of said dispersed vinyl polymer to approximately 150° C.

4. The method according to claim 1 wherein said anhydrous bisulfite is anhydrous sodium bisulfite.

5. The method according to claim 2 wherein said anhydrous bisulfite is anhydrous sodium bisulfite.

6. A toner resin comprising a vinyl polymer in which the amount of unreacted monomer has been decreased by the method of claim 1.

7. A toner resin comprising a vinyl polymer in which the amount of unreacted monomer has been decreased by the method of claim 2.

8. A toner resin comprising a vinyl polymer in which the amount of unreacted monomer has been decreased by the method of claim 3.

9. A toner resin comprising a vinyl polymer in which the amount of unreacted monomer has been decreased by the method of claim 4.

10. A toner resin comprising a vinyl polymer in which the amount of unreacted monomer has been decreased by the method of claim 5.

11. A toner resin comprising:

a vinyl polymer, said vinyl polymer containing an amount of unreacted monomer and said unreacted monomer being at least one of aromatic vinyl monomer, methacrylic ester, and acrylic ester; and a concentration of said unreacted monomers being reduced by solubilizing said unrcacted monomers with anhydrous sodium bisulfite.

12. A toner resin according to claim 11 wherein said anhydrous sodium bisulfite is present in an amount of about 0.5 to 30 parts by weight; and said vinyl polymer is present in an amount of about 100 parts by weight.

13. A method of decreasing unreacted monomers is vinyl polymer comprising:

adding anhydrous bisulfite to an aqueous dispersion in which vinyl polymer dispersed in an aqueous medium in the form of particles, said vinyl polymer having unreacted monomer and said unreacted monomer being at least one if aromatic vinyl monomer, methacrylic ester, and acrylic ester; and solubilizing unreacted monomer and removing said unreacted monomer together with said aqueous medium.

14. The method according to claim 13 wherein said anhydrous bisulfite is selected from the group consisting of anhydrous sodium bisulfite, anhydrous potassium bisulfite and anhydrous ammonium bisulfite.

15. The method according to claim 14 wherein said anhydrous bisulfite is anhydrous sodium bisulfite.

16. A toner resin comprising a vinyl polymer in which the amount of unreacted monomer has been decreased by the method of claim 13.

17. A toner resin comprising a vinyl polymer in which the amount of unreacted monomer has been decreased by the method of claim 14.

18. A toner resin comprising a vinyl polymer in which the amount of unreacted monomer has been decreased by the method of claim 15.

* * * * *